United States Patent [19]
Asadorian et al.

[11] 3,760,003
[45] Sept. 18, 1973

[54] HALOGENATED POLYPHENYL ETHERS

[75] Inventors: Arthur A. Asadorian, Midland, Mich.; Horst G. Langer, Wayland, Mass.; Jeffrey A. Funsher, Midland, Mich.

[73] Assignee: The Dow Chemical Company, Midland, Mich.

[22] Filed: Oct. 2, 1970

[21] Appl. No.: 77,704

[52] U.S. Cl............................. 260/613 R, 260/45.95
[51] Int. Cl............................................. C07c 43/20
[58] Field of Search ................................ 260/613 R

[56] References Cited
UNITED STATES PATENTS
3,532,759  10/1970  Schnell et al. ................. 260/613 R
3,567,781  3/1971  Clark ........................... 260/613 R X Primary Examiner—Bernard Helfin
Attorney—Griswold & Burdick, Herbert D. Knudsen
and C. E. Rehberg

[57] ABSTRACT

Halogenated polyphenyl ethers having the general formula

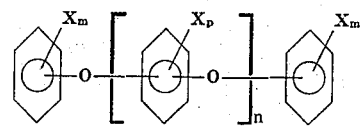

wherein:
  each X is independently Cl or Br,
  each $m$ is independently an integer of 0 to 5,
  each $p$ is independently an integer of 0 to 4,
  $n$ is an integer of 1 to 5, and
  50 percent of more by weight of the compound is halogen
have been found to be suitable fire retardants for polyester.

3 Claims, No Drawings

HALOGENATED POLYPHENYL ETHERS

BACKGROUND OF THE INVENTION

The polyphenyl ethers halogenated in the present invention are known. Synthesis of these compounds are shown by Ullmann et al. in Ann. 350, 83 (1906), Staudinger et al. in Ann. 517, 67 (1935) and Chemical Abstracts C.A. 40, 557[2] (1946) and C.A. 45, 6598c (1951), Aftergut et al. in Chem. and Ind. (London) 1959, 1090, Brown et al. in J. Chem. Eng. Data 6, No. 1, 125 (1961) and Australian Patent application No. 51,544 (Monsanto Chemical Company), published June 8, 1959. The main interest in these compounds to date has been their use as lubricants for various applications.

In general, halogenated compounds are known to be fire retardants, and halogenated diphenyl oxide has been found to be a suitable fire retardant for polyester. Yet compounds which have greater thermal stability and better fire retardancy have been sought.

SUMMARY OF THE INVENTION

It has now been found according to the present invention that halogenated polyphenyl ethers of the general formula

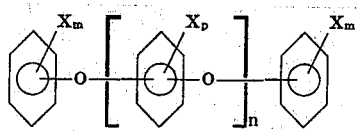

wherein:
each X is independently Cl or Br,
each $m$ is independently an integer of 0 to 5,
each $p$ is independently an integer of 0 to 4,
$n$ is an integer of 1 to 5, and
50 percent or more by weight of the compound is halogen
are highly desirable fire retardants for polyester.

The compounds of the present invention may be any of those described by the general formula above. Such compounds are easily prepared by halogenating the corresponding phenyl ether with bromine or chlorine in the presence of a Friedel Crafts catalyst. Generally such halogenation is conducted in a solvent at temperatures of about 0° to about 200°C.

For ease of nomenclature it appears to be accepted in the art that the polyphenyl ethers are classified by designations such as 3P2E which means 3 phenyl groups connected by 2 ether linkages. Suitably the positioning of the connections are also given such as m-4P3E which would mean that 4 phenyl groups are connected by 3 ether linkages and that each of the phenyl groups having 2 ether linkages have the two ether bonds in the meta positions. For those compounds which are connected in a heterogeneous fashion, the linkages are set forth for each of the phenyl groups having 2 bonds. For example, 6P5E may be mmmm or mppm or other configuration.

Of the polyphenyl ethers described by the general formula, the brominated compounds are preferred. Also preferred are compounds wherein 60 percent or more by weight of these compounds is halogen, with the perhalogenated compounds, i.e., where each $m$ is 5 and each $p$ is 4, being of special interest. Also of special interest are the compounds 4P3E, 5P4E and 6P5E, i.e., where $n$ is an integer of 2 to 4, especially those compounds having ortho and para linkages because of their higher melting points which would tend to minimize the heat distortion of polymers in which they are incorporated as fire retardants. Specific compounds of major interest in the present invention are the perbrominated p-6P5E having the formula

and the perbrominated p-3P2E having the formula

For use as fire retardants, the compounds of the present invention are physically incorporated into a substrate such as polyester, polyethylene, polypropylene, polystyrene, acrylonitrile-butadiene-styrene, polyurethane, foam rubber and the like. Such substrates containing the fire retardants of the present invention are suitably resistant towards burning even at high temperatures. The compounds of the present invention may be added to these substrates in any amount which gives the desired degree of fire retardancy without destroying the physical characteristics of the substrate. Such amounts generally range from about 1 to about 20 percent by weight of the substrate with amounts of less than 10 percent by weight of the substrate being preferred.

The important attribute of these compounds is their good thermal stability. This thermal stability allows the compounds to be used without adversely affecting the substrate by discoloration or other deleterious reaction. Yet this property does not interfere with the effectiveness of these compounds as fire retardants.

Although the compounds of the invention are desirable fire retardants when used alone, they may be employed in addition to other known fire retardants or in combination with known stabilizers. Other known fire retardants that may be employed include halogenated aromatic and aliphatic compounds, various organic phosphates, halogenated organic phosphates or antimony oxide. Suitable stabilizers include materials such as tridecyl phosphite, barium-cadmium soaps and organo tin compounds.

SPECIFIC EMBODIMENTS

Example 1 — Perbromination of 3P2E

A sample of 3P2E was determined to be a mixture of isomers containing 55 to 65 percent meta substitution, a trace of ortho substitution and the remainder of para substitution. To a reactor equipped with a stirrer and reflux condenser was charged 444 grams of 3P2E (1.69 moles) and 4 grams of iron powder as the catalyst. At room temperature, slow addition of bromine was begun. During the total time of the reaction of 8½ hours, 1700 ml. of bromine was added to the reactor. After 2 hours, 15 percent of the bromine charged had been fed into the reactor and the temperature of the reaction had reached 40° to 45°C. At this point, the reactor was gently heated over a period of 2½ hours to a temperature of 140°C. After 4½ hours of reaction, 33 percent of the total bromine has been charged into the reactor. At this time, the remainder of the bromine was added rapidly with heating regulated to maintain gentle reflux conditions. With all the bromine in, the reaction mixture was gently refluxing at 60°C. with the generation of HBr. At the end of 8½ hours, the reaction was cooled overnight and the dark mixture was heated in a water bath to complete the bromination. Perbromination was judged to be complete when a stoichiometric equivalent of HBr was accounted for in the vent gas scrubber. The excess of free bromine was then flash vaporized from the solid. This gave a recovery of 2390 g. of a dry tan powder. To improve the color of this crude product, a sample of 130 g. was heated with one liter of aqueous HCl to 75°C. and then allowed to cool overnight. This gave 125 g. of a lighter tan solid which melted at about 270°C. The overall yield of final product based on the original reactor charge of 3P2E was 99 percent.

A sample of this material was examined by gradually heating a sample over an extended period of time. The sample turned black at 200° to 250°C., melted at 270°–280°C. and bubbled and expanded at 300°–400°C. to give a tarry residue. By mass spectroscopy, the compound was examined for the volatiles emitted from the sample during heating to find that HBr was released over a range of 200°–350°C. The hydrogen for this release was probably obtained from impurities in the product such as water and by-products.

Example 2 — Perbromination of p-3P2E

In the same manner as shown in Example 1, 944 g. (5.9 moles) of bromine was reacted with 87.4 g. (0.33 mole) of p-3P2E in 500 ml. of methylene bromide. The reaction was conducted over a period of 15 hours beginning at room temperature and gradually raising the temperature to about 90°C. The product was recovered as an off-white powder weighting 445 g. for a 97.6% yield. The product had a melting point of 364°–367°C.

Example 3 — Preparation of Hexabromo p-3P2E

Into a reactor was charged 87.4 g. (0.33 mole) of p-3P2E, 500 ml. of methylene bromide and 2 g. of iron powder. As shown in Example 1, a total of 304 g. (1.9 moles) of bromine was added over a period of 5.6 hours. Partial crystallization of the product from the reaction solvent obtained 51.5 g. of off-white solids. No attempt was made to obtain the remainder of the product from the mother liquor. The product was identified as 2,5-dibromo-p-bis(2,4-dibromophenoxy)benzene by nuclear magnetic resonance spectroscopy and had a melting point of 178° to 181°C.

Example 4 — Bromination of 6P5E

To a reactor was charged 53.8 g. (0.1 mole) of p-6P5E, 500 ml. of methylene bromide and 2 g. of iron powder. Bromine was charged into the reactor dropwise while the reaction was proceeding at room temperature. As solids began to deposit, the reactor and contents were slowly heated to complete the reaction in a homogeneous liquid phase. Although an amount of bromine was added which would perbrominate the 6P5E, the reaction was terminated prematurely to give a product identified by nuclear magnetic resonance spectroscopy to be the heptadecabromo 6P5E which was obtained in 85 percent yield and had a melting range of 344° to 366°C.

Example 5 — Perbromination of 6P5E

In the same manner as shown by Example 4, 6P5E was perbrominated with bromine at a temperature of 40° to 45°C. The bromination proceeded smoothly to give a crude tan solid. Most of the color of the solid was removed by bleaching for 2 hours with warm aqueous HCl at about 50°C. Subsequent water washing and air drying at room temperature gave an off-white perbrominated 6P5E in 95 percent yield having a melting point of 394°–406°C.

The perbrominated product of this reaction was heated and the off-gas of the material was examined by mass spectroscopy. The material slowly released hydrogen brominde derived from bromine radicals and water between about 200°C. and about 350°C. at which temperature the release of HBr became more rapid and at temperatures of 550°C. the compound was still releasing hydrogen bromide.

Example 6 — Fire Retardancy in Polyester

Using the screening method ASTM-D2863, perbrominated 3P2E of the invention was compared to decabromodiphenyl oxide and octabromobiphenyl as fire retardant additives for polyester. In the test procedure, a mixture of polyethylene terephthalate and the amount of fire retardant to give five weight percent of bromine were mixed at 250°C. using a Brabender mixer. The mixture was then removed from the mill and ground to a powder. A sample was then fabricated by molding it at a pressure of 17 to 30 tons per sq. in. at 290° to 300°C. on a fiberglas support. A strip of the material 4 inches by ¼ by ⅛ inch was cut and burned in a limiting oxygen index test (LOI) as described in Combustion and Flame, 10, 135 (1966). Compounds giving high LOI for small amounts of additive are most desirable. The compound of the invention had an LOI OF 0.283 whereas at the same additive level decabromodiphenyl oxide had an LOI of 0.255 and octabromobiphenyl had an LOI of 0.261.

In the same manner as shown above, the polyphenyl ethers may be reacted with chlorine or a mixture of chlorine and bromine in the presence of a Friedel Crafts catalyst to give a halogenated product which is a suitable fire retardant for polyethylene terephthalate, polypropylene or polystyrene.

We claim:

1. A compound of the general formula

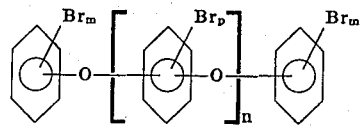

wherein each $m$ is independently an integer of 0 to 5,
each $p$ is independently an integer of 0 to 4,
$n$ is an integer of 2 to 4, and
50 percent or more by weight of the compound is bromine.

2. The compound of claim 1 having the designation perbrominated p-6P5E and the formula

$(C_6Br_5—O—C_6Br_4—O—C_6Br_4)_2O$.

3. The compound of claim 1 having the designation perbrominated p-3P2E and the formula

$C_6Br_5—O—C_6Br_4—O—C_6Br_5$.

* * * * *

UNITED STATES PATENT AND TRADEMARK OFFICE
CERTIFICATE OF CORRECTION

PATENT NO. : 3,760,003

DATED : September 18, 1973

INVENTOR(S) : Arthur A. Asadorian, Horst G. Langer, Jeffrey A. Gunsher

It is certified that error appears in the above—identified patent and that said Letters Patent is hereby corrected as shown below:

Column 4, line 55, delete "The" (first occurrence) and insert -- A --.

line 55, delete "of claim 1".

line 59, delete "The" (first occurrence) and insert -- A --.

line 59, delete "of claim 1".

Signed and Sealed this

Fourteenth Day of January 1986

[SEAL]

Attest:

DONALD J. QUIGG

Attesting Officer

Commissioner of Patents and Trademarks